(12) United States Patent
Utsumi et al.

(10) Patent No.: US 8,296,004 B2
(45) Date of Patent: Oct. 23, 2012

(54) ELECTRICALLY-DRIVEN VEHICLE

(75) Inventors: Shintaro Utsumi, Susono (JP); Satoko Tofukuji, Susono (JP); Atsunori Kumagai, Sunto-gun (JP); Nobuhisa Jingu, Izunokuni (JP); Hirotsugu Ojima, Susono (JP); Kazuhito Sakai, Makinohara (JP); Hiroki Murata, Gotenba (JP); Takanobu Arai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/394,221

(22) PCT Filed: Sep. 4, 2009

(86) PCT No.: PCT/JP2009/065464
§ 371 (c)(1),
(2), (4) Date: Mar. 5, 2012

(87) PCT Pub. No.: WO2011/027454
PCT Pub. Date: Mar. 10, 2011

(65) Prior Publication Data
US 2012/0166030 A1    Jun. 28, 2012

(51) Int. Cl.
*B60L 9/00*    (2006.01)
(52) U.S. Cl. ............ 701/22; 701/54; 180/298; 180/287; 180/65.1; 180/68.5; 180/291; 318/139
(58) Field of Classification Search .................... 701/22, 701/54; 180/298, 291, 287, 289, 65.1, 68.5; 318/139
See application file for complete search history.

(56) References Cited

U.S. PATENT DOCUMENTS

| | | | | |
|---|---|---|---|---|
| 4,973,896 | A * | 11/1990 | Shiga et al. ...................... | 322/28 |
| 5,137,108 | A * | 8/1992 | Knowlton et al. ............ | 180/298 |
| 2001/0052433 | A1* | 12/2001 | Harris et al. ................. | 180/68.5 |
| 2006/0162973 | A1* | 7/2006 | Harris et al. ................. | 180/65.3 |

FOREIGN PATENT DOCUMENTS

| | | |
|---|---|---|
| JP | 52-43607 | 4/1977 |
| JP | 59-99660 U | 7/1984 |
| JP | 63-18038 U | 2/1988 |
| JP | 1-60939 U | 4/1989 |
| JP | 1-93217 U | 6/1989 |

(Continued)

OTHER PUBLICATIONS

International Search Report issued Dec. 8, 2009 in Application No. PCT/JP2009/065464. International Preliminary Report on Patentability issued Dec. 16, 2011 in Application No. PCT/JP2009/065464 (With Partial English Translation).

*Primary Examiner* — Redhwan K Mawari
(74) *Attorney, Agent, or Firm* — Oblon, Spivak, McClelland, Maier & Neustadt, L.L.P.

(57) ABSTRACT

In an electrically driven vehicle equipped with a battery usable for running, a power generation unit of engine driven type that charges the battery is detachably mounted on the vehicle including a case where at least an engine of the power generation unit is detachably mounted, and the vehicle includes first stop means for bringing the power generation unit in a stopped state when the power generation unit is installed in or removed from the vehicle, and a generation stop switch for making an operation request to the power generation unit. More specifically, the first stop means stops an operation request signal to the power generation unit through low-voltage system wires when the generation stop switch is ON (no operation request is made).

5 Claims, 12 Drawing Sheets

FOREIGN PATENT DOCUMENTS

| | | |
|---|---|---|
| JP | 1-124820 U | 8/1989 |
| JP | 3-204341 | 9/1991 |
| JP | 2001-197604 | 7/2001 |
| JP | 2001-259099 | 9/2001 |
| JP | 2003-286000 | 10/2003 |
| JP | 2006-271122 | 10/2006 |
| JP | 2008-69517 | 3/2008 |
| JP | 2009-108853 | 5/2009 |

* cited by examiner

FIG. 7(a)　　　　　　　　　　FIG. 7(b)
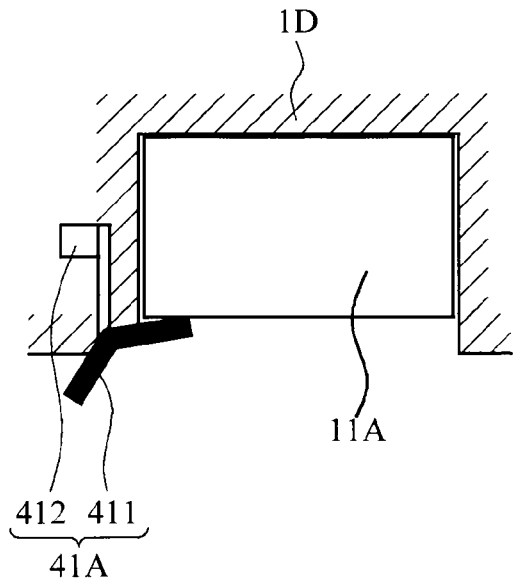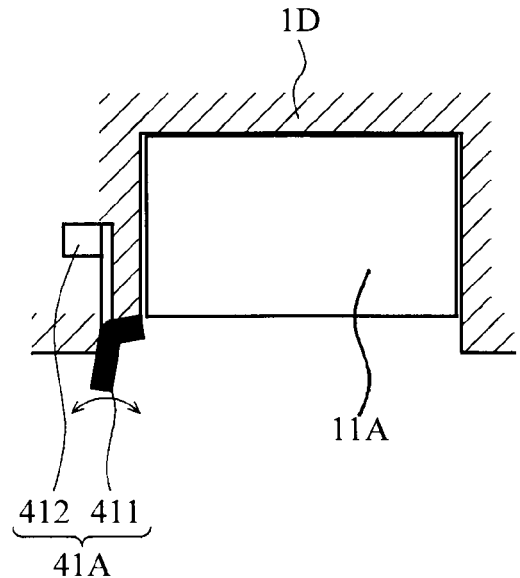
FIG. 8
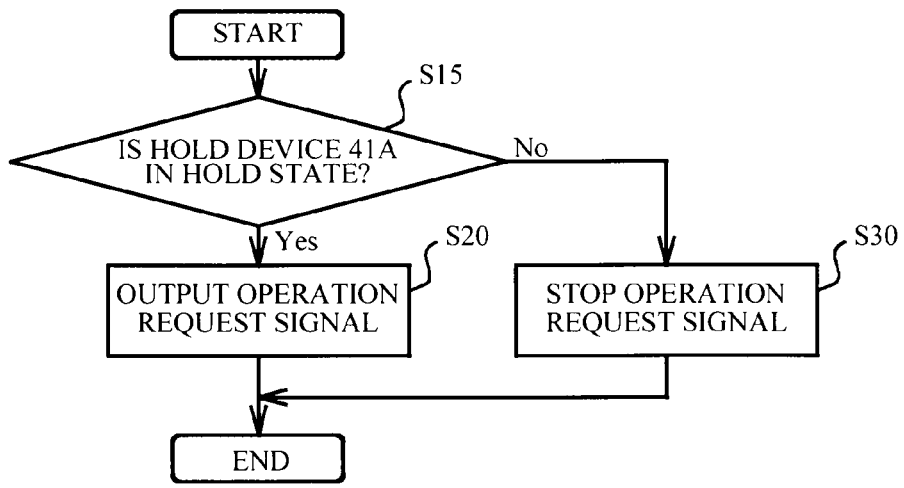

KEY SWITCH 21 ON

KEY SWITCH 21 OFF

FIG. 14

| HOLD DEVICE 41B | HOLD STATE | | INSTALLABLE/ REMOVABLE STATE |
|---|---|---|---|
| KEY SWITCH 21 | PERMIT OPERATION | | INHIBIT OPERATION |
| | ON | OFF | OFF |
| OPERATION REQUEST | YES | NO | NO |
| LEVER 411 | LOCKED | UNLOCKED | UNLOCKED |
| DIELECTRIC SWITCH 23 | OFF | ON | ON |
| CONTACT 115 (WITHIN EFFECTIVE RANGE) | ON | OFF | OFF |
| CONTACT 115 (OUTSIDE EFFECTIVE RANGE) | ON | ON | ON |

FIG. 19(a)
FIG. 19(b)
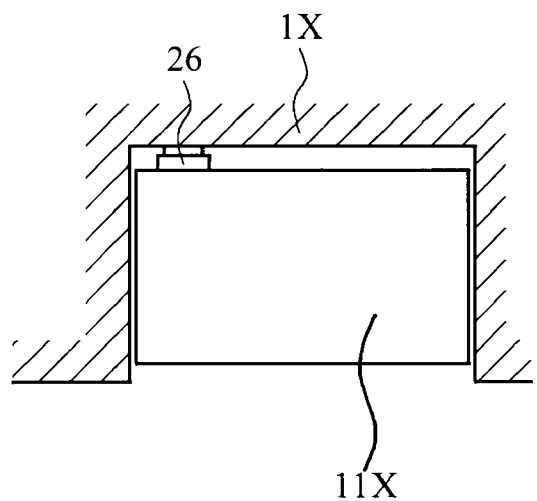
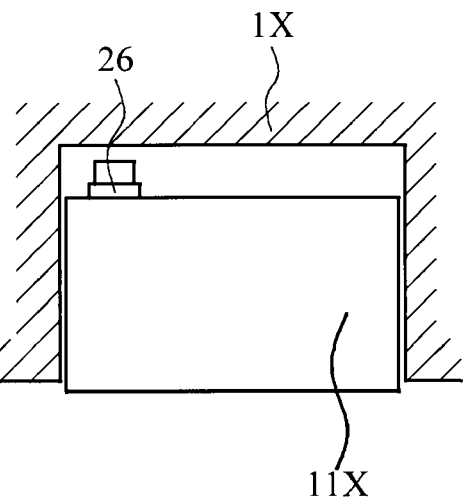

ELECTRICALLY-DRIVEN VEHICLE

TECHNICAL FIELD

The present invention relates to electrically driven vehicles, and more particularly, to an electrically driven vehicle equipped with a battery usable for running.

BACKGROUND ART

Conventionally, there is known an electrically driven vehicle equipped with a battery usable for running. It is known that such an electrically driven vehicle may be a golf cart, a forklift, a construction machine or the like. A high degree of freedom of movement may be secured by configuring the electric drive vehicle to use a battery to supply power to a source for running.

The use of the battery for power supply need to charge the battery. In this regard, Patent Document 1 discloses a vehicle equipped with an engine generation type charger. This vehicle is configured to always charge the battery by the engine generation type charger when the vehicle is in use. Therefore, the vehicle is capable of preventing the depth of discharge of the battery from becoming large. Patent Document 2 discloses a power supply system for a battery driven type construction machine in which a vehicle for power charge is delivered in accordance with a power supply instruction from the battery driven construction machine. This system is capable of supplying power to the battery without installation of battery charging equipment in the working site.

Besides, arts that would be relative to the present invention are disclosed in Patent Documents 3 through 5. In these documents, there are disclosed arts of operating or stopping an engine under a given condition. Particularly, Patent Document 3 discloses an art of making it possible to easily remove an engine from a vehicle for maintenance and inspection, and an art of stopping an engine and then removing the engine in removal of the engine from the vehicle.

PRIOR ART DOCUMENTS

Patent Documents

Japanese Patent Application Publication No. 2001-197604
Japanese Patent Application Publication No. 2008-69517
Japanese Patent Application Publication No. 03-204341
Japanese Utility Model Application Publication No. 63-18038
Japanese Utility Model Application Publication No. 01-60939

SUMMARY OF THE INVENTION

Problem to be Solved by the Invention

The vehicle disclosed in Patent Document 1 always charges the battery when the vehicle is in use. Therefore, the vehicle is always equipped with the engine generation type charger. Thus, the vehicle has an increased weight equal to the weight of the engine generation type charger, and the energy efficiency deteriorates accordingly.

In this regard, it is conceivable to detachably mount an engine driven type of power generation unit on the vehicle, wherein detachably mounting includes a case where at least the engine is mounted on the vehicle. In this case, the power generation unit is removed from and installed in the vehicle as necessary, so that deterioration of the energy efficiency due to an increase in weight can be suppressed However, when the power generation unit is removed from the vehicle, the amount of energy stored in the battery may be short in scheduled use.

In order to cope with the above, it is conceivable to remotely charge the battery on the vehicle via an extension cable that connects the power generation unit removed from the vehicle to the battery on the vehicle. Such remote charging prevents the battery from being short when the vehicle is in use even in the case where the power generation unit is removed from the vehicle. Also, the electric drive vehicle includes a construction machine used in a work in a tunnel. In the case where the electric drive vehicle is such a construction machine, the power generation unit is removed from the vehicle and is then placed outside of the tunnel. Thereafter, remote charging is carried out, so that exhaust and noise from the engine can be prevented from being emitted in the tunnel and the work environment can be improved.

However, in the case where the power generation unit is detachably installed in the vehicle, if the power generation unit that is working can be removed from the vehicle, the removal work may encounter an unexpected danger. That is, in a case where the attitude of the power generation unit in operation is changed greatly during the work of removal, an abnormal operation may happen to occur in the power generation unit. In such a case, abnormal vibration and noise may make it difficult to remove the power generation unit securely. This may cause an accident such that a hand is caught between the power generation unit and the vehicle, or the power generation unit mistakenly drops on a foot. Further, such abnormal vibration and noise may affect a controller installed in the power generation unit.

Furthermore, even in a case where an abnormal operation does not occur in the power generation unit, the following problem may occur when the power generation unit is removed for the purpose of remote charging, for example. That is, in removal of the power generation unit for remote charging, it may be more convenient to allow the power generation unit in operation to be removed in a state where the power generation unit is kept connected to the vehicle main body by wires. However, the wires interconnecting the power generation unit and the vehicle main body include low-voltage-system wires for use in control as well as high-voltage-system wires used for charging the battery. Thus, in this case, if an unexpected disconnection fault occurs especially in the high-voltage-system wires during removal of the power generation unit, a serious electric shock accident may take place.

Therefore, it is strongly desired that the electrically driven vehicle equipped with the installable and removable power generation unit is carefully designed to ensure high safety against supposable unexpected accidents described above even if such accidents have a bare possibility from not only the user's viewpoint but also the manufacturer's viewpoint.

The present invention was made taking the above problem into consideration, and aims at providing an electrically driven vehicle capable of ensuring safety of removal work on a power generation unit that is detachably mounted.

Means for Solving the Problem

The present invention that solves the above problem is an electrically driven vehicle equipped with a battery usable for running, comprising a power generation unit of engine driven type that includes a generator charging the battery and an engine driving the generator, at least the engine out of the generator and the engine being installed in and removed from the electrically driven vehicle; a source for running supplied with power from the battery; hold means holding the power generation unit in a state in the power generation unit is installed in the electrically driven vehicle; and stop means for bringing the power generation unit in a stopped state when the hold means stops holding the power generation unit in the state in which the power generation unit is installed in the electrically driven vehicle.

The above structure may further comprise a lock mechanism that locks the hold means in a case where an operation request to the source for running is made and stops locking the hold means in a case where no operation request to the source for running is made. Also, the above structure may further comprise drive means that drives the hold means to hold the power generation unit in the state in which the power generation unit is installed in the electrically driven vehicle in a case where an operation request to the source for running and stops holding the power generation unit in the state in which the power generation unit is installed in the electrically driven vehicle in a case where no operation request to the source for running is made.

In the above structure, the hold means may include a lever or cover that blocks the power generation unit from passing through an opening of the electrically driven vehicle when the power generation unit is removed from the electrically driven vehicle, and thus holds the power generation unit to be installed in the electrically driven vehicle. In the above structure, the hold means may include a bolt that fixes the power generation unit to the electrically driven vehicle, and thus holds the power generation unit to be installed in the electrically driven vehicle.

The above structure may further comprise: electromagnetic function generation means that is mounted on the vehicle and generates an electromagnetic function in a case where no operation request to the source for running is made; and means that is installed in the power generation unit and is removable from the vehicle along with the power generation unit, the means bringing the power generation unit into a stopped state when receiving the electromagnetic function by the electromagnetic function generation unit.

Effects of the Invention

According to the present invention, it is possible to ensure safety of an installation and removal work on the power generation unit when the power generation unit is installed or removed.

BRIEF DESCRIPTION OF THE DRAWINGS

FIGS. 7(a) and 7(b) are diagrams of the hold device 41A, and specifically illustrates a hold state and an installable and removable state, respectively;

FIG. 8 is a flowchart of an ECU 30D on the vehicle side;

FIG. 14 is a diagram of a state matrix corresponding to FIG. 13;

FIGS. 19(a) and 19(b) are diagrams illustrating a power generation unit 11X, and specifically illustrate the power generating unit in an installed position and that located outside the installed position, respectively.

MODES FOR CARRYING OUT THE EMBODIMENTS

Now, embodiments for carrying out the invention are described in detail with reference to the drawings.

Figure 1:
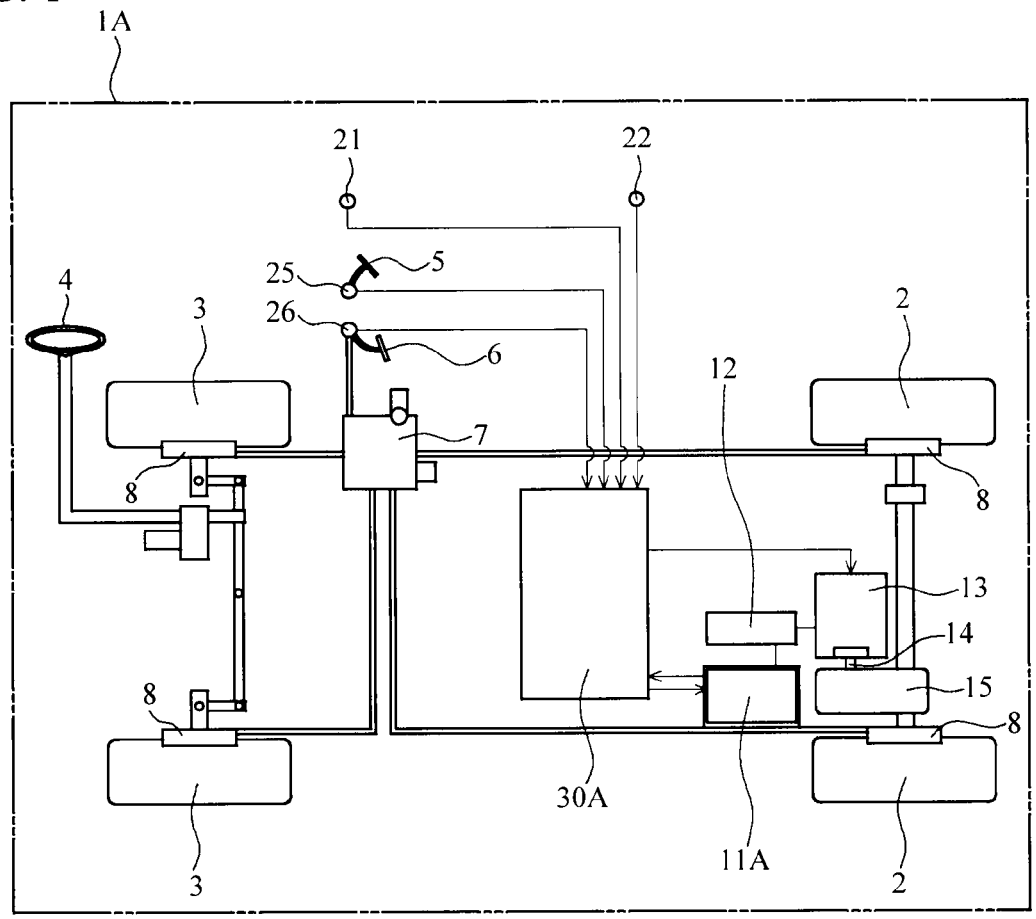
FIG. 1 is a diagram schematically illustrating an electrically driven vehicle 1A.

Referring to FIG. 1, an electrically driven vehicle 1A is equipped with a power generation unit 11A, a battery 12, and an electric motor 13. The power generation unit 11A is detachably installed in the electrically driven vehicle 1A. The electrically driven vehicle 1A with the power generation unit 11A being detachably installed can operate even in a state in which the power generation unit 11A is not installed and an electric connection with the power generation unit 11A is not made.

Figure 2:
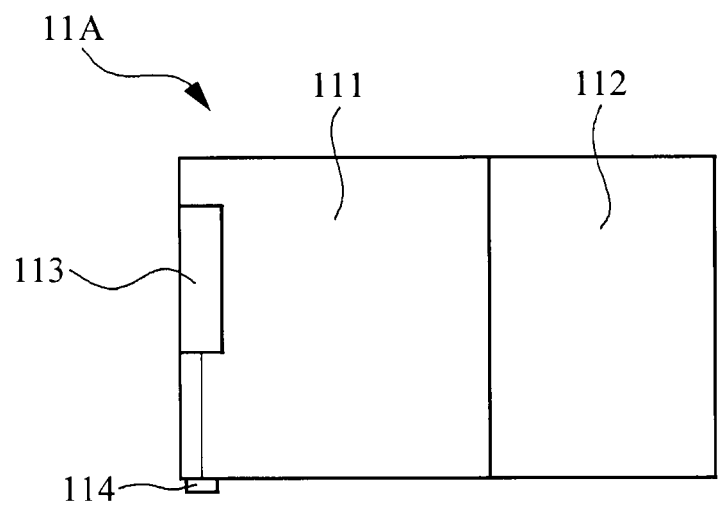
FIG. 2 is a diagram schematically illustrating an electrically driven vehicle 11A.

The power generation unit 11A is an engine driven type of power generation unit. As illustrated in FIG. 2, the power generation unit 11A is equipped with an engine 111, a generator 112, a power generation unit side ECU (Electronic Control Unit) 113, and an operation switch 114. The engine 111 drives the generator 112, which generates alternating current. Then, the alternating current thus generated is converted to direct current by a not-illustrated rectifier circuit before being charged in the battery 12. The ECU 113 on the power generation unit side is provided for primarily controlling the engine 111. The operation switch 114 is simple drive operation means and is provided for starting and stopping the power generation unit 11A. Specifically, the operation switch 114 is a switch that makes it possible to operate and stop the power generation unit 11A independently in a state in which the power generation unit 11A is electrically disconnected from the vehicle main body. The operation switch 114 is electrically connected to the ECU 113 on the power generation unit side.

The battery 12 is a DC battery and is electrically and detachably connected to the power generation unit 11A via high-voltage-system wires, which are power-system wires.

Power generated by the power generation unit 11 is charged in the battery 12 via the high-voltage-system wires. The battery 12 may be configured to have multiple batteries having a related DC voltage of 12 V connected in series, for example. The electric motor 13 is a source for running, and is a DC motor. The electric motor 13 is supplied with power from the battery 12, and rotates an output shaft 14. Then, the rotary output is transmitted, via a transmission 15, to a pair of right and left rear wheels 2, which are driving wheels, so that the rear wheels 2 can be driven. As described above, the electrically driven vehicle 1A is of a series hybrid type.

The electrically driven vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8 coupled with the brake pedal 6 by wires, joined to the brake unit 7 and provided to the front wheels 3 and the rear wheels 2. The acceleration pedal 5 is provided with an acceleration position sensor 25 that senses the amount of depression of the acceleration pedal 5, and the brake pedal 6 is provided with a brake switch 26 that senses whether the brake pedal 6 is depressed or not.

The electrically driven vehicle 1A is further provided with a key switch 21. The key switch 21 is a switch that enables selective switching operation between ON and OFF. The key switch 21 is vehicle drive operation means realized to make an operation request to the power generation unit 11A and the electric motor 13. Specifically, when the key switch 21 is ON, the operation request to the electric motor 13 is made. When the key switch 21 is OFF, the operation request to the electric motor 13 is not made.

The electrically driven vehicle 1A is further equipped with a generation stop switch 22. The generation stop switch 22 is a switch that enables a selective switching operation between ON and OFF. The generation stop switch 22 is first operation means for making an operation request to the power generation unit 11A. Specifically, when the generation stop switch 22 is OFF, no operation request is made to the power generation unit 11A. The key switch 21 and the generation stop switch 22 are provided to a not-illustrated instrument panel.

The electrically driven vehicle 1A is further equipped with a vehicle side ECU 30A, which is a first control unit. The ECU 30A on the vehicle side is equipped with a microcomputer composed of a CPU, a ROM, a RAM and so on, and an input/output circuit, which are not illustrated. The ECU 113 on the power generation unit side, which is a second control unit, is configured similarly. The power generation unit 11A (more specifically, the ECU 113 on the power generation unit side) is electrically and detachably connected to the ECU 30A on the vehicle side. In this regard, the ECU 30A on the vehicle side and the power generation unit 11A are interconnected via low-voltage-system wires, which are control-system wires. Various objects to be controlled such as the electric motor 13 are electrically connected to the ECU 30A on the vehicle side, and various sensors and switches such as the key switch 21, the acceleration position sensor 25 and the brake switch 26 are electrically connected thereto.

When the key switch 21 is OFF, the ECU 30A on the vehicle side is in a standby state in which various control operations may be executed appropriately as necessary. In the standby state, the ECU 30A is capable of, for example, detecting the states of sensors and switches, controlling the various control objects other than the electric motor 13, and outputting a drive request signal. In a case where multiple batteries that form the battery 12 and have a rated voltage of, for example, 12 V are installed, the ECU 30A on the vehicle side may be supplied with power from any one of the batteries.

The ROM is configured to store a program in which various processes executed by the CPU are described and to store map data. The CPU executes the processes on the basis of the program stored in the ROM while using a temporary memory area ensured in the RAM as necessary, so that various control means, determination means, detection means and calculation means can be functionally realized in the ECU 30A on the vehicle side and the ECU 113 on the power generation unit side.

In this regard, the ECU 30A on the vehicle side realizes operation request determination means for determining whether an operation request is made, for example.

The operation request determination means is realized to determine whether an operation request to the electric motor 13 is made and to determine whether an operation request to the power generation unit 11A is made.

In determining whether an operation request to the electric motor 13 is made, the operation request determination means is realized to determine whether an operation request is made on the basis of the state of the key switch 21. Specifically, the operation request determination means is realized to judge that an operation request has been made when the key switch 21 is ON, and to judge that an operation request has not been made when the key switch 21 is OFF.

In determining whether an operation request to the power generation unit 11A, the operation request determination means is realized to judge that an operation request has been made when the generation stop switch 22 is OFF, and to judge that no operation request has been made.

Further, the ECU 30A on the vehicle side realizes vehicle operation control means for permitting or inhibiting the operation of the electric motor 13 on the basis of the state of the key switch 21. More especially, the vehicle operation control means makes an operation request signal to the electric motor 13 when the key switch 21 is ON (when an operation request is made), and permits the electric motor 13 to operate. Thus, the electric motor 13 is put into operation. When the key switch 21 is OFF (when no operation request is made), the first operation control means stops outputting the operation request signal to the electric motor 13 and inhibits the operation of the electric motor 13. Thus, the electric motor 13 is put into operation.

Further, the ECU 30A on the vehicle side realizes first permission means for putting the power generation unit 11A into operation. Specifically, the first permission means outputs an operation request signal to the power generation unit 11A via the low-voltage-system wires. In response to this signal, the ECU 113 on the power generation unit side allows the engine 111 to operate, and the power generation unit 11A is put into operation. More specifically, the first permission means is realized to put the power generation unit 11A into operation when the generation stop switch 22 is OFF (when an operation request is made).

Further, the ECU 30A on the vehicle side realizes first stop means for bringing the power generation unit 11A into the stopped state. Specifically, the first stop means stops the operation request signal to the power generation unit 11A via the low-voltage-system wires. In response to this signal, the ECU 113 on the power generation unit side stops the operation of the engine 111, whereby the power generation unit 11A is brought into the stopped state. More specifically, the first stop means is realized to bring the power generation unit 11A into the stopped state when the power generation unit 11A is removed. Specifically, a case that corresponds to "when the power generation unit 11A is installed or removed"

may be a case where the generation stopping switch 22 is ON (when no operation request is made) in the present embodiment.

Meanwhile, the ECU 113 on the power generating side realizes first operation control means for permitting and inhibiting the operation of the power generation unit 11A (more specifically, the engine 111) alone in accordance with the state of the operation switch 114 in a state in which the power generation unit 11A is electrically disconnected from the vehicle main body, for example. Specifically, the first operation control means permits the operation of the power generation unit 11A alone when the operation switch 114 is ON. The power generation unit 11A is thus put into operation. When the operation switch 114 is OFF, the first operation control means inhibits the operation of the power generation unit 11A alone. The power generation unit 11A is thus brought into the stopped state.

Also, the ECU 113 on the power generation unit side realizes second operation control means for permitting and inhibiting the operation of the power generation unit 11A (more specifically, the engine 111) in accordance with the presence and absence of the operation request to the power generation unit 11A. Specifically, the second operation control means permits the operation of the power generation unit 11A when an operation request signal is input. When the second operation control means does not receive the operation request signal, the second operation control means inhibits the operation of the power generation unit 11A. Thus, the power generation unit 11A is brought into the stopped state.

Figure 3:
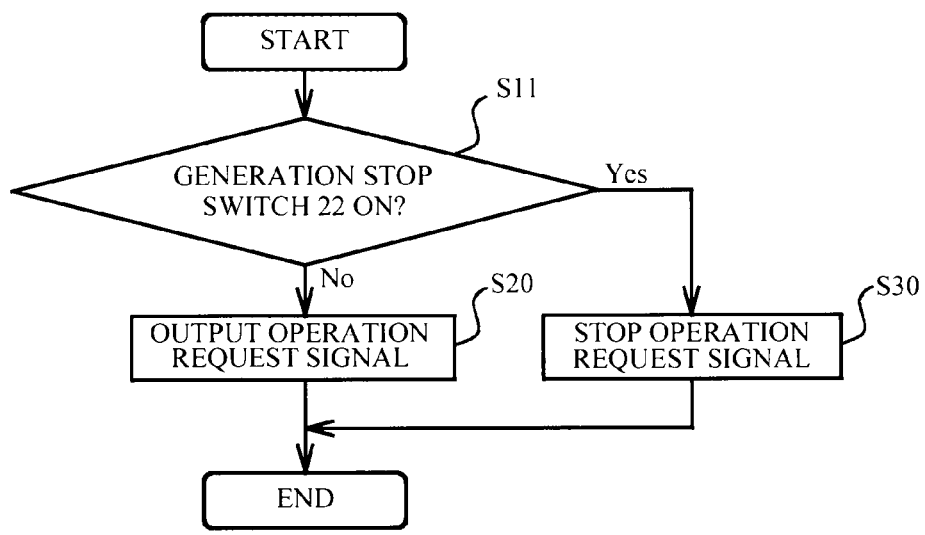
FIG. 3 is a flowchart of an operation of an ECU 30A on the vehicle side.

Next, a description is given of an operation of the ECU 30A on the vehicle side with reference to a flowchart of FIG. 3. The ECU 30A on the vehicle side determines whether the generation stop switch 22 is ON (step S11). When the determination result is negative, there is an operation request because the generation stop switch 22 is OFF. Thus, in this case, the ECU 30A on the vehicle side outputs the operation request signal to the ECU 113 on the power generation unit side (step S20). This permits the power generation unit 11A to operate, whereby the power generation unit 11A is put into operation.

In contrast, when the determination result of step S11 is positive, there is no operation request since the generation stop switch 22 is ON. Thus, in this case, the ECU 30A on the vehicle side stops the operation request signal (step S30). This inhibits the power generation unit 11A from operating, whereby the power generation unit is brought into the stopped state.

As described above, the electrically driven vehicle 1A is capable of bring the power generation unit 11A into the stopped state under the condition that the power generation unit 11A and the vehicle main body are electrically connected together by turning ON the generation stop switch 22.

Thus, in the electrically driven vehicle 1A, it is possible, by turning ON the generation stop switch 22, to prevent the power generation unit 11A that is generating power in remote charging from being installed in the vehicle. Further, by turning ON the generation stop switch 22, it is possible to prevent the power generation unit 11A that is generating power from being removed from the vehicle for the purpose of, for example, remote charging. It is therefore possible to prevent an electric shock accident from occurring in an unexpected disconnection fault.

Also, by preventing removal and installation of the power generation unit 11A that is generating power in the above-described manner, the electrically driven vehicle 1A is capable of preventing the occurrence of an unforeseen accident. Additionally, the electrically driven vehicle is capable of preventing the ECU 113 on the power generation unit side from being affected by an abnormal vibration and noise due to abnormal operation.

Second Embodiment

An electrically driven vehicle 1B in accordance with the present embodiment is substantially the same as the electrically driven vehicle 1A except that the key switch 21 is replaced by second operation means described below, and the vehicle 1B is not equipped with the generation stop switch 22 and that the vehicle 1B is equipped with an ECU 30B on the vehicle side instead of the ECU 30A on the vehicle side. Therefore, illustration of the electrically driven vehicle 1B is omitted in the present embodiment.

In the present embodiment, the key switch 21 is the second operation means for making an operation request to the power generation unit and simultaneously making an operation request to the electric motor 13. That is, the key switch 21 that is the second operation means is operation means that functions as both vehicle drive operation means and first operation means. Specifically, when the key switch 21 is ON, the vehicle is in a state in which there are an operation request to the power generation unit 11A and that for the electric motor 13. When the key switch 21 is OFF, the vehicle is in a state in which there are no operation requests for the power generation unit 11A and the electric motor 13.

Since the key switch 21 that is the second operation means, the ECU 30B on the vehicle side is substantially the same as the ECU 30A on the vehicle side except that the operation request determination means is realized as described below, and second permission means is provided instead of the first permission means, and that second stop means is provided instead of the first stop means.

In the present embodiment, the operation request determination means is realized to determine whether the operation requests to the electric motor 13 and the power generation unit 11A are made on the basis of the state of the key switch 21. Specifically, the operation request determination means determines that the operation requests are made when the key switch 21 is ON, and determines that the operation requests are not made when the key switch 21 is OFF.

The second permission means is the same as the first permission means except that the second permission means puts the power generation unit 11A into operation when the key switch 21 is ON (when operation requests are made).

The second stop means is substantially the same as the first stop means except that the second stop means brings the power generation unit 11A into the stopped state in a case where the key switch 21 is OFF (when no operation requests are made) as a case "where the power generation unit 11A is installed or removed".

Figure 4:
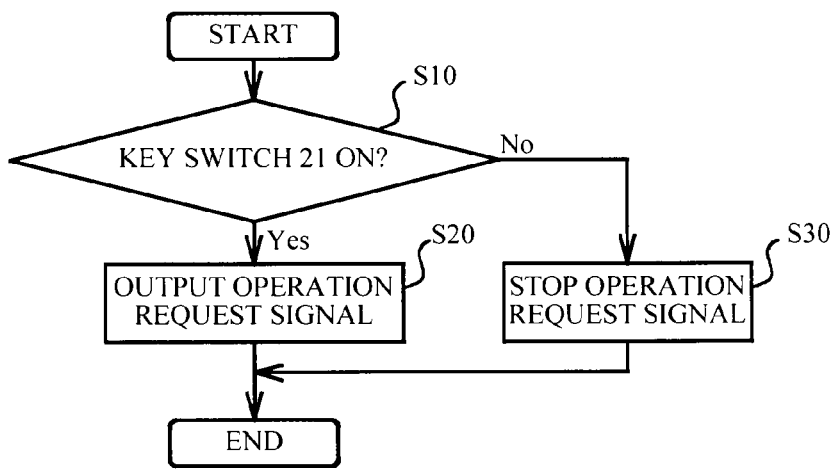
FIG. 4 is a flowchart of an operation of an ECU 30B on the vehicle side.

Next, a description is given, with reference to a flowchart of FIG. 4, of an operation of the ECU 30B on the vehicle side. The ECU 30B on the vehicle side determines whether the key switch 21 is ON (step S10). When the determination result is positive, the control proceeds to step S20. Thus, the power generation unit 11A and the electric motor 13 are put into operation. In contrast, when the determination result of step S10 is negative, the control proceeds to step S30. Thus, the power generation unit 11A and the electric motor 13 are brought in the stopped state.

In the electrically driven vehicle 1B, by turning OFF the key switch 21, the power generation unit 11A can be brought into the stopped state under the condition that the power generation unit 11A and the vehicle main body are electrically connected together. Therefore, the electrically driven vehicle 1B is capable of obtaining effects similar to those of the electrically driven vehicle 1A by turning OFF the key switch 21.

In the electrically driven vehicle 1B, the electric motor 13 is simultaneously stopped by turning OFF the key switch 21. Therefore, in the electrically driven vehicle 1B, it is possible to prevent the electrically driven vehicle 1B from being mistakenly operated during the installation or removal work on the power generation unit 11A and to further improve the safety.

Third Embodiment

An electrically driven vehicle 1C in accordance with the present embodiment is substantially the same as the electrically driven vehicle 1A except that the key switch 21 is the second operation means, and the generation stop switch 22 is not the first operation means but is interlock condition adding mans, and that an ECU 30C on the vehicle side is substituted for the ECU 30A on the vehicle side. Therefore, illustration of the electrically driven vehicle 1C is omitted in the present embodiment.

The ECU 30C on the vehicle side is substantially the same as the ECU 30A on the vehicle side except that second permission means is provided instead of the first permission means and third stop means is provided instead of the first stop means.

The third stop means is substantially the same as the second stop means except that the third stop means brings the power generation unit 11A into the stopped state in a case where the key switch 21 is OFF (when t no operation requests are made) as a case "where the power generation unit 11A is installed or removed".

In this regard, the third stop means is realized to bring the power generation unit 11A into the stopped state when the key switch 21 is OFF and the generation stop switch 22 is ON.

That is, in the present embodiment, the generation stop switch 22 is the interlock condition adding means for adding, as an interlock condition, a condition that the generation stop switch 22 is ON to the conditions for bringing the power generation unit 11A into the stopped state.

"At least" in the third stop means that OFF of the key switch 21 is the minimum necessary condition and that even when the key switch 21 is OFF, the power generation unit 11A is permitted to be put into operation in a case where the added interlock condition does not stand.

In the third stop means, a case where the key switch 21 is OFF and the generation stop switch 22 is ON corresponds to a case where no operation request is made and the interlock condition stands.

Figure 5:
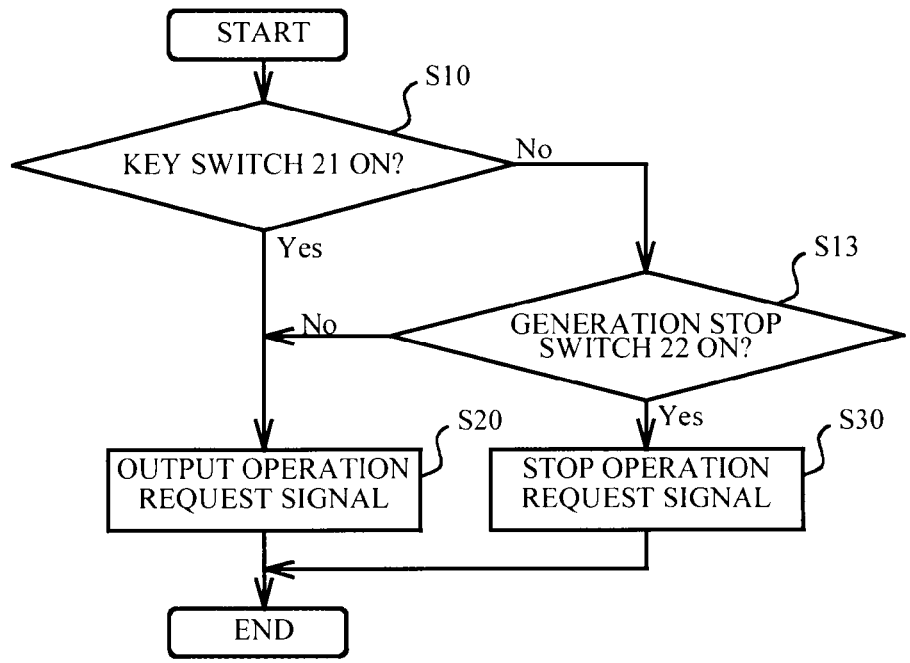
FIG. 5 is a flowchart of an operation of an ECU 30C on the vehicle side.

Next, a description is given, with reference to a flowchart of FIG. 5, of an operation of the ECU 30C on the vehicle side. The ECU 30C on the vehicle side determines whether the key switch 21 is ON (step S10). When the determination result is positive, the control proceeds to step S20. Thus, the power generation unit 11A and the electric motor 13 are put into operation. In contrast, when the determination result of step S10 is negative, the ECU 30 on the vehicle side determines whether the generation stop switch 22 is ON (step S13). When the determination result is positive, the control proceeds to step S30. Thus, the power generation unit 11A and the electric motor 13 are brought into the stopped states. In contrast, when the determination result of step S13 is negative, the control proceeds to step S20. Thus, the power generation unit 11A and the electric motor 13 are put into operation. That is, even if the key switch 21 is OFF, an operation request is made when the generation stop switch 22 is OFF, and the ECU 30C on the vehicle side makes the operation request signal.

In the electrically driven vehicle 1C, the electric motor 13 is brought in the stopped state by turning OFF the key switch 21, and the power generation unit 11A is brought into the stopped state under the condition that the power generation unit 11A and the vehicle main body are electrically connected together by turning OFF the generation stop switch 22. Thus, the electrically driven vehicle 1C has effects similar to those of the electrically driven vehicle 1B by turning OFF the key switch 21 and turning ON the generation stop switch 22.

In the electrically driven vehicle 1C, even when the key switch 21 is OFF, the power generation unit 11A can be put into operation by turning OFF the generation stop switch 22. That is, the electrically driven vehicle 1C has improved convenience because charging by the power generation unit 11A is enabled even when the key switch 21 is OFF.

As is seen from the flowchart of FIG. 5, the electrically driven vehicle 1C can be understood so that it is equipped with multiple operation means of the key switch 21 and the generation stop switch 22, and is equipped with stop means for bringing the power generation unit 11A into the stopped state in a case where all of the multiple operation means are operated to make requests for stopping the operation requests to the power generation unit 11A as a case "where the power generation unit 11A is installed or removed". In this case, the electrically driven vehicle 1C can be understood so that it is simultaneously equipped with permission means for putting the power generation unit 11A into operation in a case where any one of the multiple operation means is operated to make an operation request to the power generation unit 11A.

Fourth Embodiment

An electrically driven vehicle 1D in accordance with the present embodiment is substantially the same as the electrically driven vehicle 1A except that hold device 41A is provided instead of the generation stop switch 22, and an ECU 30D on the vehicle side is substituted for the ECU 30A on the vehicle side. Thus, illustration of the electrically driven vehicle 1D is omitted in the present embodiment.

Figure 6:
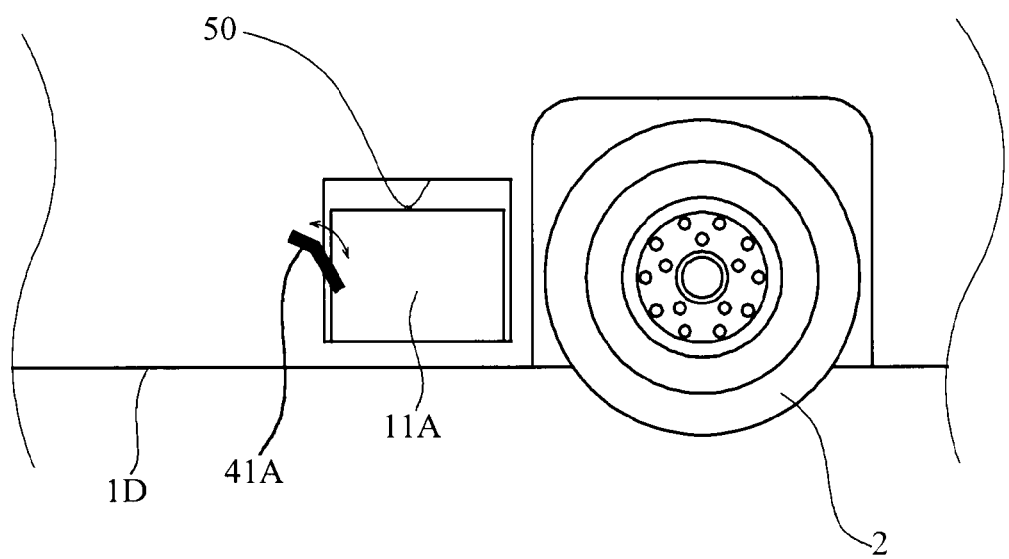
FIG. 6 is a diagram illustrating an arrangement of a hold device 41A.

As illustrated in FIG. 6, the hold device 41A is installed in a vehicle opening portion 50 through which the power generation unit 11A is installed or removed. As illustrated in FIG. 7, the hold device 41A is equipped with a lever 411 that is a hold member, and a state detection sensor 412 that is state detecting means. The lever 411 is provided for realizing switching between a hold state (state depicted in FIG. 7A) in which the power generation unit 11A is held in position and an installation and removable state (state depicted in FIG. 713) in which the power generation unit 11A is installable and removable. More specifically, the hold state prevents the power generation unit 11A installed from being removed, and prevents the power generation unit 11 that is not installed from being installed. The lever 411 of the hold device 41A is manually operated. The state detection sensor 412 detects the hold state of the hold device 41A and the installable and removable state thereof.

The hold device 41A enables the state switching operation between the hold state and the installable and removable state and is third means for making an operation request to the power generation unit 11A. Specifically, when the hold device 41A is held in position, the vehicle is in a state in which an operation request to the power generation unit 11A is made. When the hold device 41A is in the installable and removable state, the vehicle is in a state in which no operation request to the power generation unit 11A is made.

The ECU 30D on the vehicle side is substantially the same as the ECU 30A on the vehicle side except that the state detection sensor 412 is further connected electrically as a sensor/switch element, and the operation request determination means is realized below since the hold device 41A is the third operation means, and that third permission means is provided instead of the first permission means, and fourth stop means is provided instead of the first stop means.

The operation request determination means is realized to determine whether an operation request to the power generation unit 11A is made in accordance with the state of the hold device 41A. Specifically, it is determined that an operation request is made when the hold device is held in position, and is determined that no operation request is made when the hold device 41A is in the installable and removable state.

The third permission means is substantially the same as the first permission means except that the third permission means is realized to put the power generation unit 11A into operation when the hold device 41A is held in position (when an operation request is made).

The fourth stop means is substantially the same as the first stop means except that the fourth stop means is realized to bring the power generation unit 11A into the stopped state when the hold device 41A is in the installable and removable state (no operation request is made).

Next, a description is given, with reference to a flowchart of FIG. 8, of an operation of the ECU 30D on the vehicle side. The ECU 30D on the vehicle side determines whether the hold device 41A is held in position (step S15). When the determination result is positive, the control proceeds to step S20. Thus, the power generation unit 11A is put into operation. In contrast, when the determination result of step S15 is negative, the control proceeds to step S30. Thus, the power generation unit 11A is brought into the stopped state.

Here, the above-described embodiments premise that the switches 21 and 22 are operated appropriately on the basis of intent to install or remove the power generation unit 11A that is generating power when doing so. However, if the switch 21 or 22 is not operated appropriately, there is provided no system for blocking installation and removal work on the power generation unit 11A that is generating power.

In contrast, in the electrically driven vehicle 1D, installation and removal of the power generation unit 11A is not physically possible unless the lever 411 is operated to place the hold device 41A in the installable and removable state under the condition that the power generation unit 11A and the vehicle main body are electrically connected together. Thus, the electrically driven vehicle 1D is capable of ensuring higher safety because the power generation unit 11A is surely stopped when it is intended to remove the power generation unit 11A in the state in which the power generation unit 11A and the vehicle main body are electrically connected together.

Fifth Embodiment

An electrically driven vehicle 1E in accordance with the present embodiment is substantially the same as the electrically driven vehicle 1A except that the key switch 21 is second operation means, and the vehicle 1E is further equipped with a not-illustrated key lock mechanism capable of permitting and inhibiting the operation of the key switch 21, and that a hold device 41B is provided instead of the generation stop switch 22, and an ECU 30E on the vehicle side is provided instead of the ECU 30A on the vehicle side. Thus, illustration of the electrically driven vehicle 1E is omitted in the present embodiment.

The hold device 41B is substantially the same as the hold device 41A except that there is further provided a not-illustrated lever lock mechanism. The lever lock mechanism is switching restriction means capable of permitting and inhibiting the state switching operation of the hold device 4113 in the hold state in accordance with the presence and absence of the operation request. Specifically, the lever lock mechanism inhibits the state switching operation by locking the lever 411 when the key switch 21 is ON (when an operation request is made), and permits the state switching operation by unlocking the lever 411 when the key switch 21 is OFF (when no operation request is made).

The key lock mechanism is operation restriction means capable of permitting and inhibiting the operation of the key switch 21 in accordance with the state of the hold device 41B. Specifically, the key lock mechanism permits the operation of the key switch 21 when the key lock mechanism is in the hold state, and inhibits the operation of the key switch 21 when the hold device 4113 is in the installable and removable state.

Also, the hold device 41B is first hold means capable of performing a state switching operation between the hold state and the installable and removable state, and permitting and inhibiting the state switching operation in the hold state in accordance with the presence and absence of an operation request by inhibiting the state switching operation when an operation request is made and permitting the state switching operation when no operation request is made. The first hold means is installation and removal preventing means for disabling the installation and removal of the power generation unit 11A.

The ECU 30 on the vehicle side is substantially the same as the ECU 30B on the vehicle side except that the key lock mechanism and the lever lock mechanism are electrically connected as objects to be controlled, and operation restriction control means and switching restriction control means described below are functionally realized.

The operation restriction control means is realized to control the key lock mechanism to permit the operation of the key switch 21 when the hold device 41B is in the hold state and to inhibit the operation of the key switch 21 when the hold device 41B is in the installable and removable state.

The switching restriction control means is realized to control the lever lock mechanism to lock the lever 411 when the key switch 21 is ON (when an operation request is made) and to unlock the lever 411 when the key switch is OFF (when no operation request is made).

In this regard, the operation restriction control means permits the operation of the key switch 21. Thus, when the hold device 41B is in the hold state, the key switch 21 may be ON or OFF. Also, when the key switch 21 is ON, the hold device 41B is in the hold state without exception because the switching restriction control means locks the lever 411. In contrast, when the hold device 41B is OFF, the switching restriction control means unlocks the lever 411, whereby the hold device 41B can be switched to the installable and removable state. When the switching to the installable and removable state is done, the operation restriction control means inhibits the operation of the key switch 21.

As described above, the electrically driven vehicle 1E is configured that the operation restriction control means and the switching restriction control means are interrelated with each other and the operation of the key switch 21 is inhibited when the hold state 41B is in the installable and removable state, specifically, when the key switch is OFF. In other words, the key switch 21 is prevented from being turned ON when the hold device 41B is in the installable and removable state.

Figure 9:
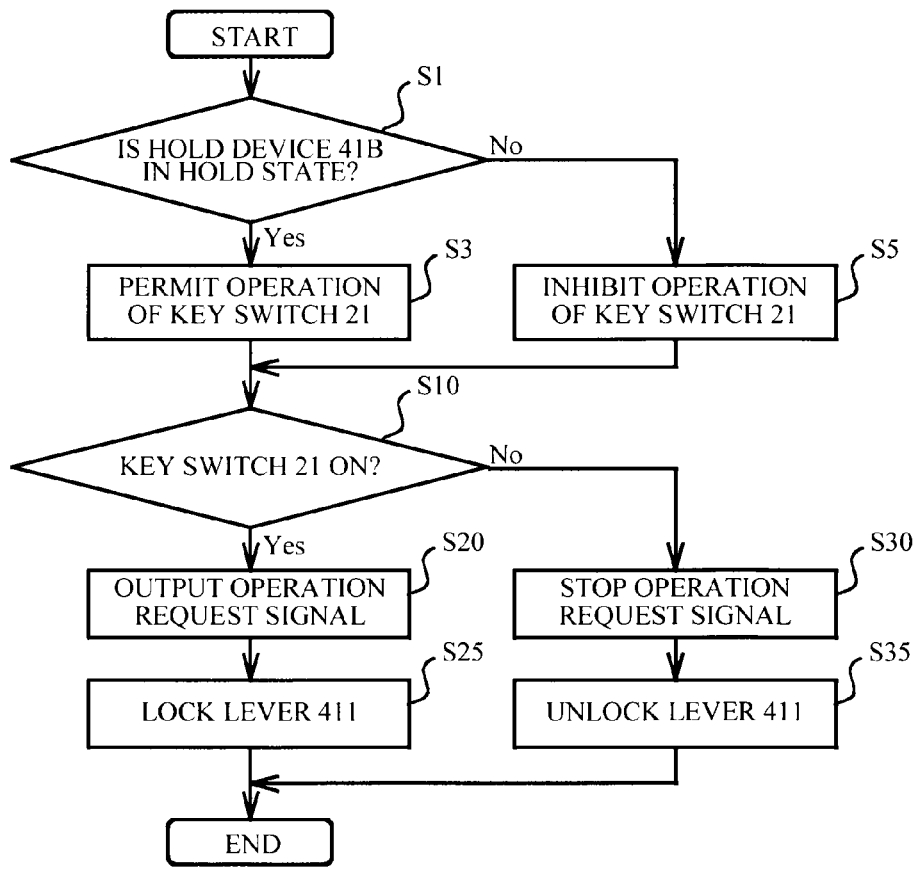
FIG. 9 is a flowchart of an ECU 30E on the vehicle side.

A description is now given, with reference to a flowchart of FIG. 9, of an operation of the ECU 30E on the vehicle side. The state of the electrically driven vehicle 1E when the present flowchart starts is any of a state in which the hold device 41B is in the hold state and the key switch 21 is ON, a state in which the hold device 41B is in the hold state and the key switch 21 is OFF, and a state in which the hold device 41B is in the installable and removable state and the key switch 21 is OFF.

The ECU 30E on the vehicle side determines whether the hold device 41B is in the hold state (step S1). When the determination result is positive, the ECU 30E on the vehicle side permits the operation of the key switch 21 (step S3). In contrast, when the determination result of step S1 is negative, the ECU 30E on the vehicle side inhibits the operation of the key switch 21 (step S5). Further, subsequent to step S3 or S5, the ECU 30E on the vehicle side determines whether the key switch 21 is ON (step S10). When the determination result of step S10 is positive, the hold device 41B is in the hold state.

When the determination result of step S10 is positive, the ECU 30E on the vehicle side makes an operation request signal (step S20), and locks the lever 411 (step S25). Thus, the power generation unit 11A an the electric motor 13 are put into operation, and the lever 411 is locked in the hold state when the power generation unit 11A is generating power. In contrast, when the determination result of step S10 is negative, the ECU 30E on the vehicle side stops the operation request signal (step S40), and unlocks the lever 411 (step S55). Thus, the power generation unit 11A and the electric motor 13 are brought into the stopped state, and the switching operation on the state of the hold device 41B becomes possible.

The aforementioned electrically driven vehicle 1D of the fourth embodiment is not provided with any system for restricting the operation of the state switching operation of the hold device 41A. Therefore, it may be considered that the power generation unit 11A that is generating power may be mistakenly stopped in the electrically driven vehicle 1D.

Also, in the electrically driven vehicle 1D, the switch operation of the hold device 41A is possible even when the electric motor 13 is operating. Thus, the installation and removal work on the power generation unit 11A can be done when the electric motor 13 is operating in the electrically driven vehicle 1D. Thus, it may be conceivable that a situation such that the electrically driven vehicle 1D is mistakenly operated during the installation and removal work on the power generation unit 11A may occur.

In contrast, the electrically driven vehicle 1E is capable of inhibiting the switching operation on the hold device 41B when the power generation unit 11A is generating power by locking the lever 411 in the hold state when the key switch 21 is ON in a state in which the power generation unit 11A and the vehicle main body are electrically connected together. Thus, in the electrically driven vehicle 1E, it is possible to prevent the power generation unit 11A that is generating power from being installed or removed when the key switch 21 is ON and to simultaneously prevent the power generation unit 11A that is generating power from being stopped against an operator's intent by an inappropriate manual operation on the lever 411.

Also, the electrically driven vehicle 1E is capable of inhibiting the switching operation on the hold device 41 from being done when the electric motor 13 is operating by locking the lever 411 in the hold state when the key switch 21 is ON. That is, it is possible to prevent the installation or removal work on the power generation unit 11A from being done when the electric motor 13 is operating. In the electrically driven vehicle 1E, it is thus possible to prevent the electrically driven vehicle 1B from being mistakenly driven during the installation or removal work on the power generation unit 11A.

Also, the electrically driven vehicle 1E permits the state switching operation on the hold device 41B when the key switch 21 is OFF, and thus permits the hold device 41B to be in the installable and removable state only when the key switch 21 is OFF. Also, the electrically driven vehicle 1E permits the operation of the key switch 21 only when the hold device 41B is in the hold state, whereby power generation of the power generation unit 11A is not started in the installable and removable state. Thus, the electrically driven vehicle 1E is capable of permitting the installation and removal of the power generation unit 11A only when the power generation unit 11A and the electric motor 13 are in the stopped states, and it is thus possible to surely prevent the power generation unit 11A that is generating power from being installed or removed.

Sixth Embodiment

An electrically driven vehicle 1F in accordance with the present embodiment is substantially the same as the electrically driven vehicle 1A except that the key switch 21 is second operation means, and a hold device 41C is provided instead of the generation stop switch 22, and that an ECU 30F on the vehicle side is provided instead of the ECU 30A on the vehicle side. Therefore, illustration of the electrically driven vehicle 1F is omitted in the present embodiment.

The hold device 41C is substantially the same as the hold device 41A except that the hold device 41C is further equipped with a not-illustrated drive actuator. The drive actuator is switch drive means for driving the lever 411 to switch the state of the hold device 41C between the hold state and the installation and removable state. More specifically, the drive actuator switches the state of the hold device 41C in accordance with the presence and absence of the operation request by setting the hold device 41C to the hold state when the key switch is ON (when an operation request is made), and by setting the hold device 41C to the installable and removable state when the key switch 21 is ON (when no operation request is made). That is, the lever 411 of the hold device 41C cannot be operated manually.

The hold device 41C with the drive actuator described above is second hold means for switching the state of the hold device 41C between at least two states of the hold state and the installable and removable state by setting the hold device 41C to the hold state when an operation request is made and by setting the hold device 41C to the installable and removable state when no operation request is made. The second hold means is installation and removal preventing means for disabling installation and removal of the power generation unit 11A when an operation request is made.

The ECU 30F on the vehicle side is substantially the same as the ECU 30B on the vehicle side except that the drive actuator is electrically connected as an object to be controlled, and switch drive control means is functionally realized.

The switch drive control means is realized to control the drive actuator to set the hold device 41C to the hold device 41C when the key switch 21 is ON (when an operation request is made) and to set the hold device 41C to the installable and removable state when the key switch 21 is OFF (when no operation request is made).

Figure 10:
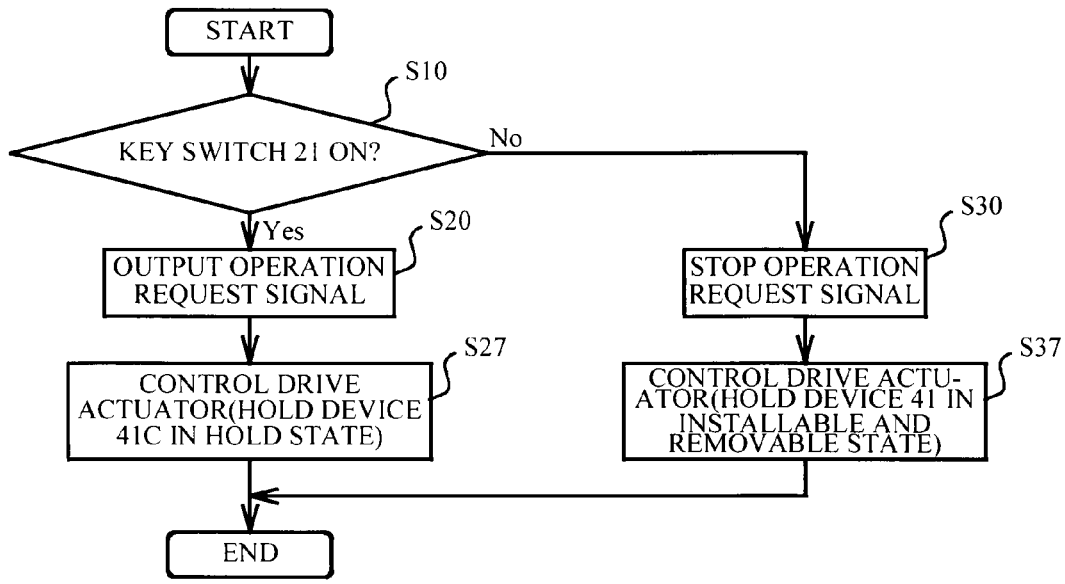
FIG. 10 is a flowchart of an ECU 30F on the vehicle side.

A description is now given, with reference to a flowchart of FIG. 10, of an operation of the ECU 30F on the vehicle side. The ECU 30F on the vehicle side determines whether the key switch 21 is ON (step S10). When the determination result is positive, the ECU 30F on the vehicle side makes an operation request signal (step S20), and controls the drive actuator to bring the hold device 41C into the hold state (step S27). Thus, the power generation unit 11A and the electric motor 13 are put in operation, and the hold device 41C is maintained in the hold state when the power generation unit 11A is generating power. In contrast, when the determination result of step S10 is negative, the ECU 30F on the vehicle side stops the operation request signal (step S30), and controls the drive actuator to set the hold device 41C to the installable and removable state (step S37). Thus, the power generation unit 11A and the electric motor 13 are brought into the stopped states, and the power generation unit 11A becomes installable and removable.

In the electrically driven vehicle 1F, the power generation unit 11A is put into operation when the key switch 21 is ON, and the hold device 41C is maintained in the hold state. When the key switch 21 is OFF, the power generation unit 11A is brought into the stopped state and the hold device 41C is maintained in the installable and removable state. Therefore, in the electrically driven vehicle 1F, the power generation unit 11A is installable or removable only when the power generation unit 11A and the electric motor 13 are in the stopped states as in the case of the electrically driven vehicle 1E, so that the power generation unit 11A that is generating power can be surely prevented from being installed or removed.

Seventh Embodiment

An electrically driven vehicle 1G in accordance with the present embodiment is substantially the same as the electrically driven vehicle 1A except that a power generation unit 11B is detachably installed instead of the power generation unit 11A, and an induction switch 23 described below is provided instead of the generation stop switch 22, and that an ECU 30G on the vehicle side is provided instead of the ECU 30A on the vehicle side. Therefore, illustration of the electrically driven vehicle 1G is omitted in the present embodiment.

Figure 11A:
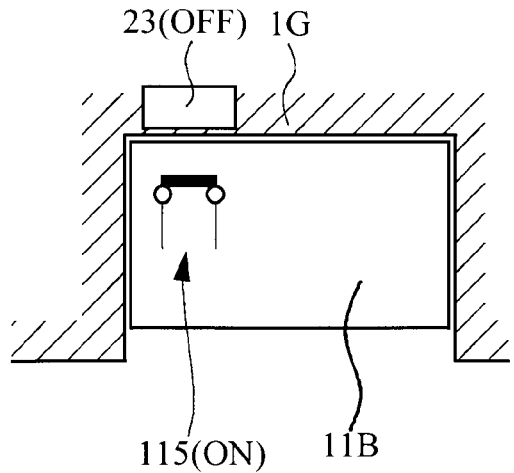
FIGS. 11(a) and 11(b) are diagrams of a power generation unit 11B together with states of an induction switch 23 and a contact 115, and specifically illustrate a case where a key switch 21 is ON and a case where the key switch 21 is OFF.
Figure 11B:
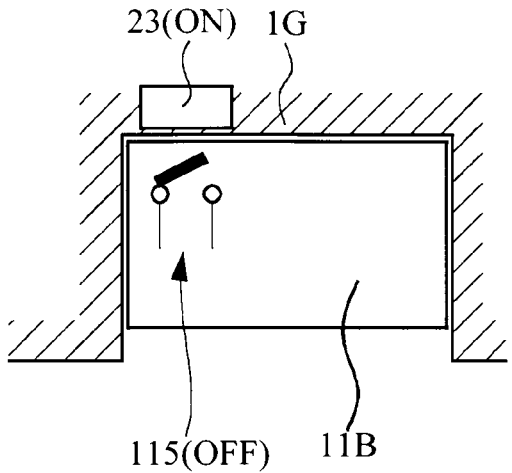

As illustrated in FIG. 11, the induction switch 23 is provided so as to face the power generation unit 11B installed in the vehicle. The induction switch 23 is electromagnetic function generating means for generating an electromagnetic function. The induction switch 23 is turned ON and OFF (generation of the electromagnetic function is permitted or inhibited) in accordance with ON/OFF of the key switch 21. In this regard, the key switch 21 in the present embodiment is switch operation means for performing a switch operation that permits and inhibits the electromagnetic function by the electromagnetic function generating means.

More specifically, since the key switch 21 is the vehicle drive operation means also, the key switch 21 is switching operation means for performing a switching operation between a case where the electromagnetic function by the electromagnetic function generating means is inhibited from being generated and the electric motor 13 is put in operation and a case where the electromagnetic function by the electromagnetic function generating means is permitted and the electric motor 13 is brought into the stopped state. Thus, the induction switch 23 is OFF when the key switch 21 is ON (see FIG. 11(a)), and is ON when the key switch 21 is OFF (see FIG. 11(b)).

The power generation unit 11B is substantially the same as the power generation unit 11A except that there is provided a contact 115 in a position where the power generation unit 11B in the installed state faces the induction switch 23. The operation of the power generation unit 11B is permitted when the contact 115 is ON, and is inhibited when the contact 115 is OFF. The state of the contact 115 is turned ON and OFF due to the electromagnetic function of the induction switch 23 in accordance with ON and OFF of the induction switch 23. Specifically, the contact 115 is turned ON when the induction switch 23 is OFF (see FIG. 11(a)), and is turned OFF when the induction switch is ON (see FIG. 11(b)).

The state of the contact 115 is also changed on the basis of whether the contact 115 is within an effective range of the electromagnetic function of the induction switch 23. Specifically, in the case where the contact 115 is not located within the effective range of the electromagnetic function of the induction switch 23, the contact 115 is ON even if the induction switch 23 is ON. The effective range of the electromagnetic function of the induction switch 23 includes the contact 115 when the power generation unit 11B is placed in position, and extends to the contact 115 of the power generation unit 11B that is located short of the installation position The contact 115 is operation automatic manipulation means for permitting and inhibiting the operation of the power generation unit 11B according to the electromagnetic function of the electromagnetic function generating means. Specifically, the operation automatic manipulation means permits the operation of the power generation unit 11B when the electromagnetic function is exerted, and inhibits the operation of the power generation unit 11B when the electromagnetic function is not exerted.

The induction switch 23 and the contact 115 form stop means for bringing the power generation unit 11B into the stopped state when the power generation unit 11B is installed or removed. As a case "where the power generation unit 11B is installed or removed" in the induction switch 23 and the contact 115 that act as the fifth means is a case "where the key switch 21 is OFF (a case where the switch operation means permits the generation of the electromagnetic function by the electromagnetic function generating means)" in removal of the power generation unit 11B, and a case "where the key switch 21 is OFF and the contact 115 enters into the effective range of induction switch 23 (the switch operation means permits the generation of the electromagnetic function by the electromagnetic function generating means and the operation automatic manipulation means enters into the effective range of the electromagnetic function by the electromagnetic function generating means)".

The electrically driven vehicle 1G on the vehicle is substantially the same as the ECU 30A on the vehicle side except that the first permission means and the first stop means are not provided and electromagnetic function generation control means described below is functionally realized.

The electromagnetic function generation control means is realized to control ON/OFF switching of the induction switch 23 according to ON/OFF of the key switch 21. Specifically, the electromagnetic function generation control means is realized to turn OFF the induction switch 23 when the key switch 21 is ON, and to turn ON the induction switch 23 when the key switch 21 is OFF.

Figure 12:
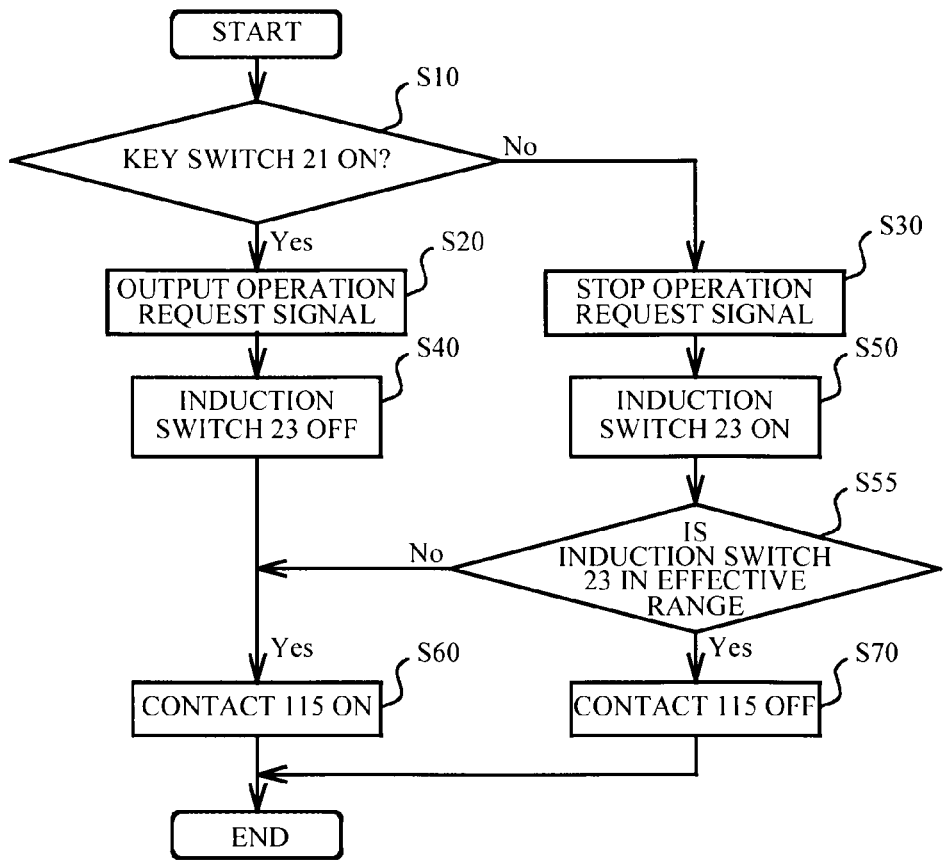
FIG. 12 is a flowchart of an operation of an ECU 30G on the vehicle side.

Next, a description is given, with reference to a flowchart of FIG. 12, of an operation of the ECU 30G on the vehicle side along with changes of the state of the contact 115. The ECU 30G on the vehicle side determines whether the key switch 21 is ON (step S10), and makes an operation request signal when the determination result is positive (step S20). Thus, the electric motor 13 is put in operation. Subsequent to step S20, the ECU 30G on the vehicle side turns OFF the induction switch 23 (step S40). In this case, the contact 115 is turned ON irrespective of whether the contact 115 is located within the effective range of the electromagnetic function by the induction switch 23 (step S60).

In contrast, when the determination result of step S10 is negative, the ECU 30G on the vehicle side stops the operation request (step S30). Thus, the electric motor 13 is brought into the stopped state. Subsequent to step S30, the ECU 30G on the vehicle side turns ON the induction switch 23 (step S50). When the induction switch 23 is not located within the effective range of the electromagnetic function, the contact 115 is turned ON (step S60). When the induction switch 23 is located within the effective range of the electromagnetic function, the contact 115 is turned OFF (step S70).

Here, the above-described embodiments suppose a case where remote charging is carried out, and premise that each of the ECUs 30 on the vehicle side and the vehicle main body are electrically connected together.

However, in a case where each of the ECUs 30 on the vehicle side and the vehicle main body are not electrically connected together, each ECU 30 on the vehicle side cannot output the operation request signal to the ECU 113 on the power generation unit side. Thus, the power generation unit 11A cannot be operated or stopped by the operation request signal.

On the other hand, the power generation unit 11A is operable alone, and is likely to be installed or removed during operation.

In contrast, the electrically driven vehicle 1G is capable of preventing the power generation unit 11B that is generating power from being installed even in a state in which the power generation unit 11B is not electrically connected to the vehicle main body. That is, in the electrically driven vehicle 1G, irrespective of whether such an electric connection with the vehicle main body is made or not, the determination result at step S10 is negative by turning OFF the key switch 21 in installation of the power generation unit 11B, and subsequent to steps S30 and S50, the determination result at step S55 is positive when the contact 115 enters into the effective range of the induction switch 23, whereby the contact 115 is turned OFF at step S70. Therefore, it is possible to stop the power generation unit 11B that is generating power regardless of whether the electric connection with the vehicle main body is made or not and to prevent the power generation unit 11B that is generating power from being installed.

The determination result at step S10 is negative by turning OFF the key switch 21 in removal of the power generation unit 11B, and subsequent to steps S30 and S50, the determination result at step S55 is positive because the contact 115 is located within the effective range of the induction switch 23, whereby the contact 115 is turned OFF at step S70. Therefore, it is possible to stop the power generation unit 11B that is generating power regardless of whether the electric connection with the vehicle main body is made or not and to prevent the power generation unit 11B that is generating power from being removed.

The contact 115 is turned OFF when the contact 115 goes beyond the effective range of the induction switch 23 during the removal work on the power generation unit 11B that is generating power. In this case, the power generation unit 11B does not start to operate. This is because no operation request to the power generation unit 11B is made. On this point, the premise is that the power generation unit 11B is electrically connected to the vehicle main body surely in order to operate the power generation unit 11B for charging. Therefore, it is possible to further provide the electrically driven vehicle 1G with, for example, first operation means, first permission means and first stop means and with second operation means, second permission means and second stop means. That is, the fifth means is additionally provided with first stop means and the second stop means as further stop means. In this case, the key switch 21 may be not only the switch operation means but also second operation means.

As described above, the electrically driven vehicle 1G can ensure higher safety because the electrically driven vehicle 1G is capable of preventing installation and removal of the power generation unit 11B that is generating power irrespective of whether the electric connection with the vehicle main body is made or not. Also, the electric motor 13 is brought into the stopped state by turning OFF the key switch 21, and the electrically driven vehicle 1G can be prevented from being mistakenly driven during installation or removal work on the power generation unit 11B.

It may be conceived that an electrically driven vehicle 1X illustrated in FIG. 19 is equipped with stop means that is effective even in a case where the power generation unit 11B is electrically connected to the vehicle main body as in the case of the electrically driven vehicle 1G. However, the electrically driven vehicle 1X does not correspond to the stop means of the present invention for the following reasons.

Here, the electrically driven vehicle 1X is equipped with a power generation unit 11X instead of the power generation unit 11B, and the power generation unit 11X is equipped with a toggle switch 24 instead of the induction switch 23. The toggle switch 24 is turned ON when the power generation unit 11X is installed in position, and is turned OFF when the power generation unit 11X is out of position. In the electrically driven vehicle 1X, it is conceived that the operation of the power generation unit 11X is inhibited when the toggle switch 24 is switched to ON from OFF, and is inhibited when the toggle switch 24 is inversely switched to OFF from ON.

However, if it is supposed to inhibit the operation of the power generation unit 11X when the toggle switch 24 is switched to ON from OFF during an installation work on the power generation unit 11X, the power generation unit 11X stops at the same time as the installation work on the power generation unit 11X is complete.

In contrast, if it is supposed to inhibit the operation of the power generation unit 11X when the toggle switch 24 is turned to OFF from ON during a removal work on the power generation unit 11X, the power generation unit 11X stops as the same time as the removal work on the power generation unit 11X is started.

On this point, "when the power generation unit is installed or removed" in the stop means of the present invention requires a timing before the installation work on the power generation unit is completed, and a timing before the removal work is started. Thus, the toggle switch 24 does not correspond to the stop means.

Also, in the electrically driven vehicle 1G, the premise is to turn OFF the key switch 21 when the power generation unit is removed. However, the electrically driven vehicle 1G does not have any system that prevents installation and removal of the power generation unit 11B when the key switch 21 is ON. Therefore, the power generation unit 11B that is generating power is likely to be installed or removed.

However, regarding this, the further use of the aforementioned hold device 41B in the fifth embodiment or the aforementioned hold device 41C in the sixth embodiment makes it possible to physically preclude installation and removal of the power generation unit 11B unless the key switch 21 is turned OFF, so that higher safety can be ensured.

Thus, in order to ensure the highest safety, the electrically driven vehicle 1G is most preferable to be further equipped with the hold device 41B and the structures related hereto previously described in the fifth embodiment or with the hold device 41C and the structures related hereto previously described in the sixth embodiment.

Next, a description is given, with reference to a flowchart of FIG. 13 and a state matrix depicted in FIG. 14, of a case where the electrically drive vehicle 1G is further equipped to the hold device 41B and the structures related hereto (hereinafter, it is referred to as electrically driven vehicle 1G'). The present flowchart is a combination of the flowchart of FIG. 9 and a flowchart of FIG. 12.

As illustrated in FIG. 14, the operation of the key switch 21 is permitted when the hold device 41B is in the hold state. When the key switch 21 is ON, the operation request is "YES", the lever 411 is "LOCKED", and the induction switch 23 is "OFF" (which correspond to steps S1, S3, S10, S20, S25 and S40 in the flowchart of FIG. 13). Thus, the electrically driven vehicle 1G' is capable of preventing the power generation switch 11B that is generating power from being installed or detached irrespective of whether the power generation unit 11B is electrically connected to the vehicle main body by physically precluding the power generation unit 11B from being installed or removed when the key switch 21 is ON before the contact 115 is turned ON (step S60 of the flowchart of FIG. 13).

Figure 13:
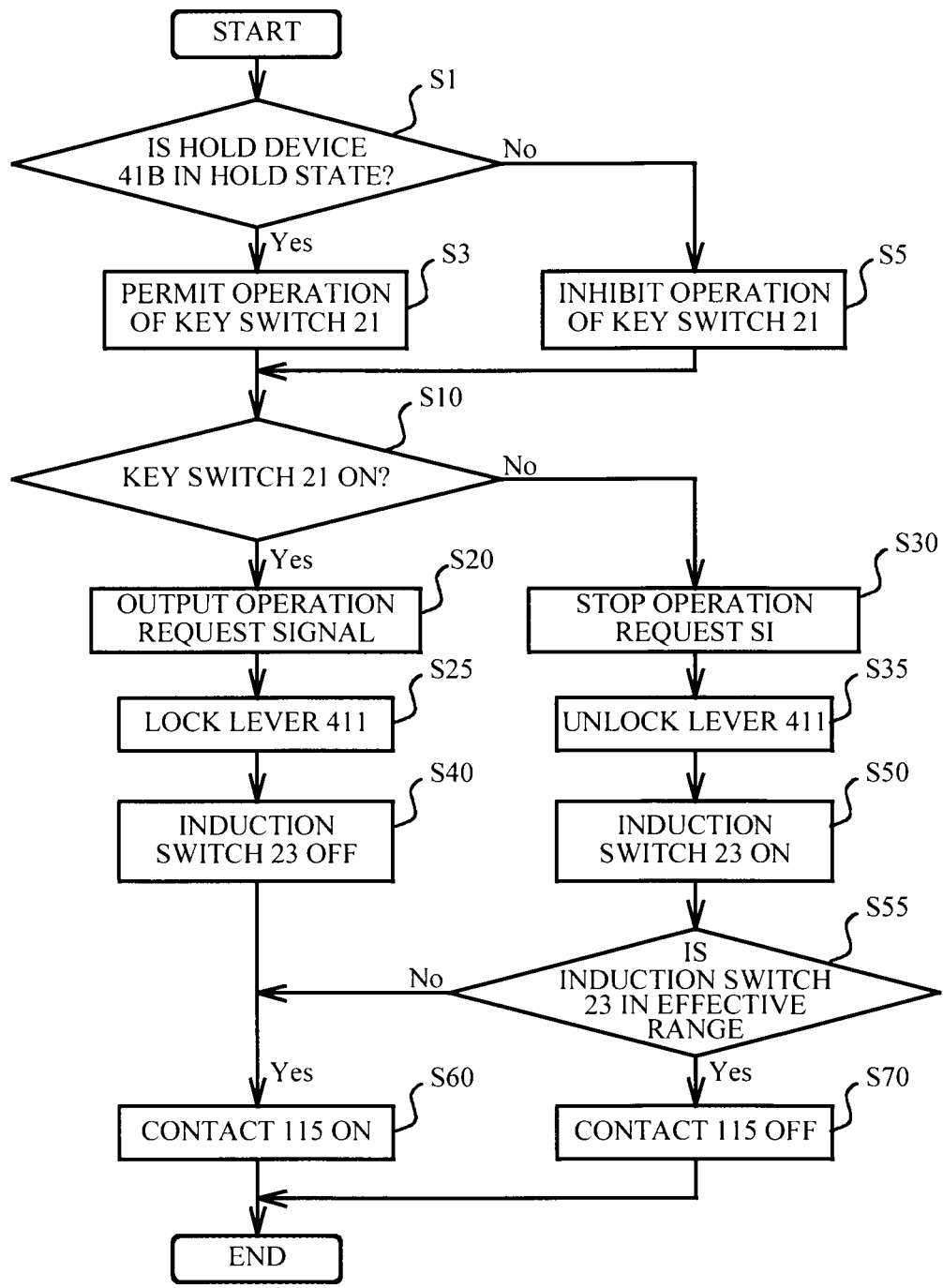
FIG. 13 is a flowchart of an operation of an ECU 30G' on the vehicle side.

In contrast, when the key switch 21 is turned OFF from this state, the operation request is "NO", the lever 411 is "UNLOCKED", and the induction switch 23 is "ON" (which corresponds to steps S10, S30, S35 and S50 in the flowchart of FIG. 13). In this state, the contact 115 is OFF when the contact 115 is located within the effective range of the electromagnetic function of the induction switch 23, and is ON when the contact 115 is located within the effective range (which corresponds to steps S55, S60 and S70 in the flowchart of FIG. 13). In this state, the lever 411 is manually operated, so that the hold device 41B can be set to the installable and removable state from the hold state.

When the lever 411 is manually operated to set the hold device 4113 to the installable and removable state, the operation of the key switch 21 is further inhibited (which corresponds to steps S1 and S5 in the flowchart of FIG. 13). In this state, the power generation unit 11B is installable and removable. On this point, in a case where the power generation unit 11B that is generating power is intended to be installed, the contact 115 is turned OFF when the contact 115 enters into the effective range of the electromagnetic function of the induction switch 23 from the outside thereof even if an electric connection with the vehicle main body is not made. Thus, the power generation unit 11B can be brought into the stopped state. When the key switch is turned OFF under the condition that an electric connection with the vehicle main body is made, no operation request is made, and the power generation unit 11B can be brought into the stopped state. Therefore, it is possible to prevent the power generation unit 11B that is generating power from being installed.

When the power generation unit 11B that is generating power is intended to be removed, the premise is that the power generation unit 11B is electrically connected to the vehicle main body. This is because, if there is no electric connection with the vehicle main body, the power generation unit 11B that is completely installed in the stopped state cannot be operated by the operation request. Therefore, even when the power generation unit 11B that is generating power is intended to be removed from the electrically driven vehicle 1G', no operation request is made when the key switch 21 is turned OFF, and the power generation unit 11B is stopped. Even in the case where there is no electric connection with the vehicle main body, the contact 115 is turned OFF when the key switch 21 is turned OFF when the contact 115 is located within the effective range of the electromagnetic function of the induction switch 23, so that the power generation unit 11B can be brought into the stopped state. It is therefore possible to prevent the power generation unit 11B that is generating power from being removed.

The above-described embodiments are preferred embodiments of the present invention. However, the present invention is not limited to these embodiments but may be carried out in various variations without departing from the range of the present invention.

For example, in the above-described embodiments, the cases where each power generation unit 11 is detachably installed have been described. However, the present invention is not limited to the cases, but may be configured to detachably install at least the engine.

In the above-described third embodiment, the case has been described where the interlock condition adding means adds, as the interlock condition, the condition that the generation stop switch 22 is ON to the conditions for bringing the power generation unit 11A into the stopped state. However, the present invention is not limited to the above, but the interlock condition adding means may be a hold device 45 illustrated in FIG. 15.

Figure 15A:
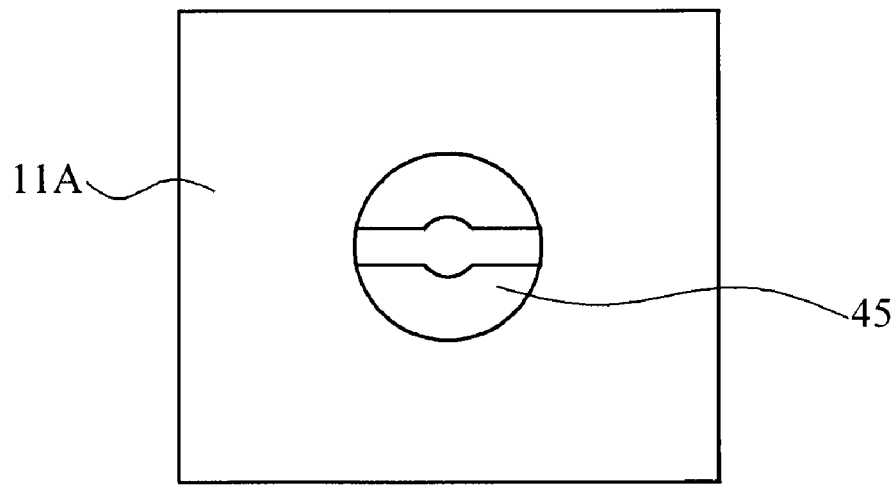
FIGS. 15(a) and 15(b) are diagrams illustrating a hold device 45, and are specifically plan and side views of the hold device 45, respectively.
Figure 15B:
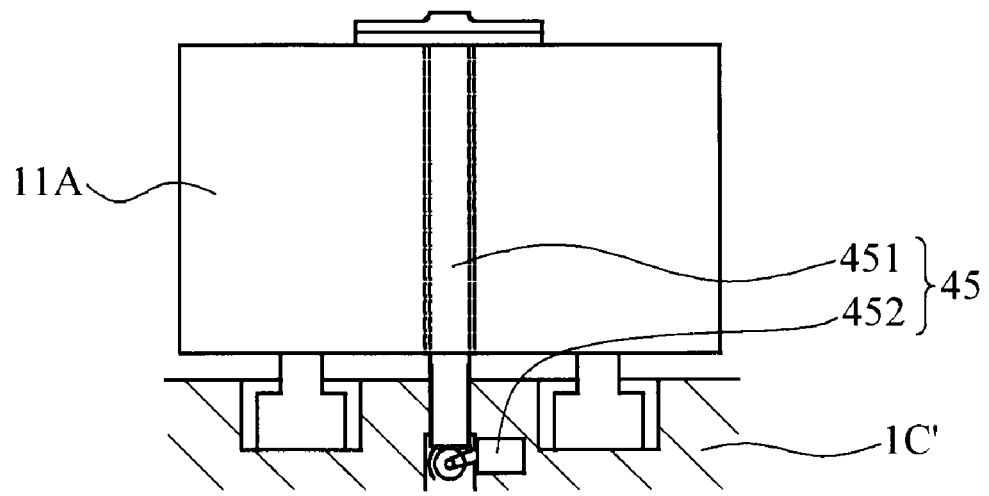

The hold device 45 illustrated in FIG. 15 is equipped with a fixing bolt as a hold member, and a fixing detection switch 452 as state detection means. The hold device 45 has a hold state in which the hold device 45 is fixed by the fixing bolt 451, and the fixing detection switch 452 is ON. The hold device 45 has another state in which the hold device 45 is installable and removable in which the fixing bolt 451 is removed. The hold device 45 is interlock condition adding means for adding, as the interlock condition, a condition that the hold device 45 is the hold state to the conditions for bringing the power generation unit 11A into the stopped state. It is therefore possible to inhibit the power generation unit 11A from being put into operation in the state in which the power generation unit 11A is not installed in position and to improve the safety.

On this point, the present invention may be configured so that the stop means brings the power generation unit into the stopped state in the absence of at least the operation request in such a manner that "at least" includes not only a case where the stop means brings the power generation unit into the stopped state in the absence of the operation request but also another case where the stop means brings the power generation unit into the stopped state when the added interlock condition does not stand even in the presence of the operation request.

In the above-described fourth embodiment, the case has been described where the hold device 41A is the third operation mans. However, the present invention is not limited to the above, but the third operation means may be a hold device 42A described below.

Figure 16:
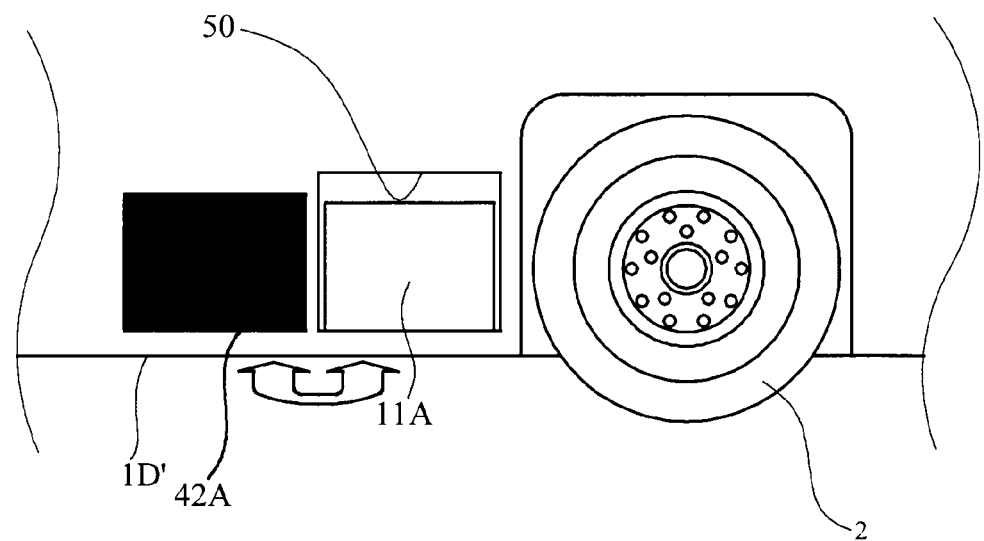
FIG. 16 is a diagram illustrating an arrangement of a hold device 42A.
Figure 17A:
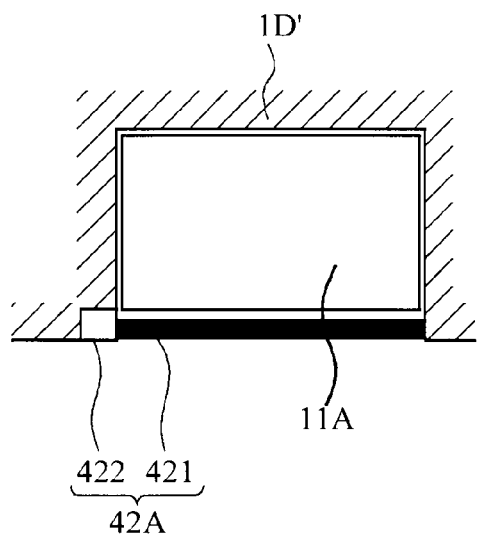
FIGS. 17(a) and 17(b) are diagrams illustrating the hold device 42A, and specifically illustrate a hold state and an installable and removable state, respectively.
Figure 17B:
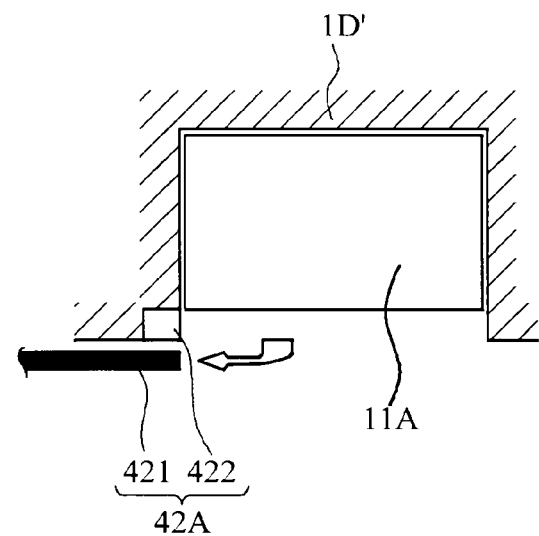

As illustrated in FIG. 16, the hold device 42A is provided in the vehicle opening portion 50 through which the power generation unit 11A is passed in installation and removal. As illustrated in FIG. 17, the hold device 42A is equipped with a cover 421 that is a hold member, and a state detection sensor 422 that is state detection means. The cover 421 is provided for switching the state of the hold device 42A between a hold state (a state illustrated in FIG. 17(a)) and an installable and removable state (a state illustrated in FIG. 17(b)). The cover 421 in the hold device 42A is manually operated. The state detection sensor 422 detects the hold state of the hold device 42A and the installable and removable state thereof. The hold device 42A described above has effects similar to those of the hold device 41A.

In the above-described fifth embodiment, the case has been described where the hold device 41B is the first hold means. However, the present invention is not limited to the above, but the first hold means may be, for example, a hold device configured so that a cover lock mechanism for locking and unlocking the cover 421 is further provided to the hold device 42A, as in the case of the hold device 41B for the hold device 41A. Such a hold device has effects similar to those of the hold device 41B.

In the above-described sixth embodiment, the case has been described where the hold device 41C is the second hold means. However, the present invention is not limited to the above, but the second hold means may, for example, be a hold device configured so that a drive actuator capable of switching the state between the hold state and the installable and removable state by driving the cover 421 is further provided to the hold device 42A, as in the case of the hold device 41C for the hold device 41A. Such a hold device has effects similar to those of the hold device 41C.

Structures corresponding to the first and second hold means are variously conceivable. An example of the structures is illustrated in FIG. 18.

Figure 18A:
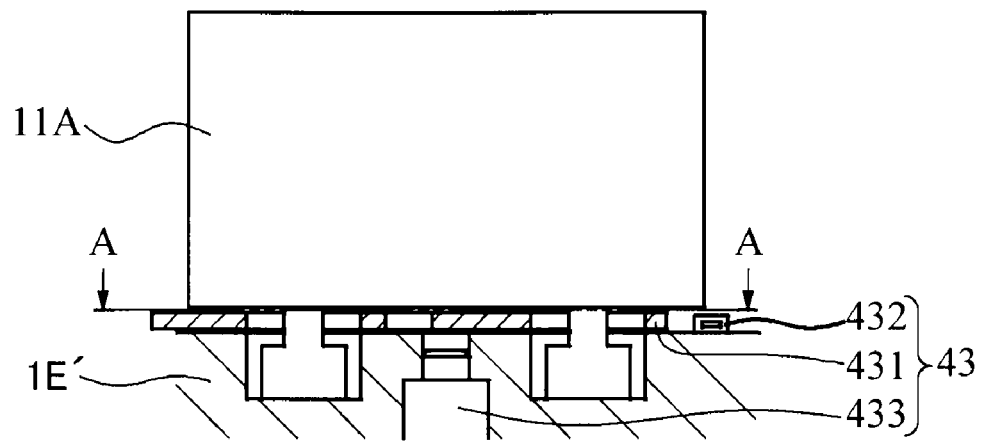
FIGS. 18(a) and 18(b) are diagrams illustrating a hold device 43, and are specifically a side view of the hold device and a cross-sectional view taken along a line A-A in FIG. 18(a), wherein a state of a lock plate 431 illustrated by a solid line is an installable and removable state and a state illustrated by a two-dotted broken line is a hold state.
Figure 18B:
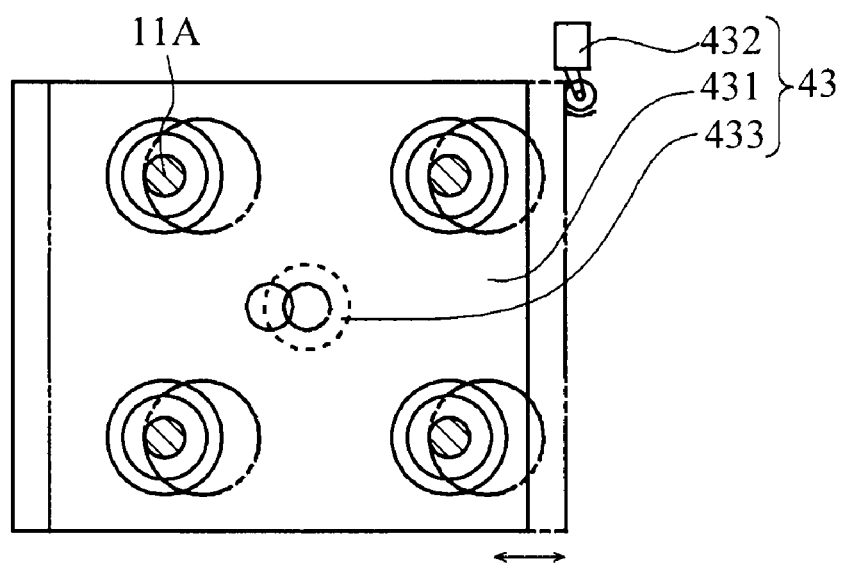

A hold device 43 illustrated in FIG. 18 is equipped with a lock plate 431 serving as a hold member, a fixing detection switch 432 serving as state detection means, and a lock cylinder 433 serving as switch restriction means, and corresponds to the first hold means. In FIG. 18B, a state of the lock plate 431 indicated by a solid line is the installable and removable state, and a state thereof indicated by a two-dotted broken line is the hold state. The hold device 43 thus configured has effects similar to those of the hold device 41B.

Further, a hold device configured by varying the hold device 43 so as to include a drive actuator that switches the state by the hold state and the installable and removable state by driving the lock plate 431 instead of the lock cylinder 433 corresponds to the second hold means. The hold device thus configured has effects similar to those of the hold device 41C.

In the above-described fifth through seventh embodiments, the case has been described where the key switch 21 is the second operation means. This is because it is reasonable to employ a structure for operating and stopping the power generation unit together with the second operation means in order to realize installation and removal of the power generation unit in the vehicle stopped state. However, the present invention is not limited to the above, but the first operation means is employed instead of the second operation means to operate and stop the power generation unit. This is because, even when the first operation means is employed for the second operation means, installation and removal of the power generation unit can be realized in the vehicle stopped state by, for example, adding the interlock condition.

In the above-described embodiments, the case has been described where the operation means for making the operation request to the power generation unit 11A or the electric motor 13 is the switch enabling the selective switching operation between ON and OFF because the case is structurally reasonable. However, the present invention is not limited to the above, but operation means for making the operation request may be equipped with operation means for making the operation request as operation request manipulation means and with operation means for stopping the operation request as operation request stopping means separate from the operation request manipulation means, and the operation request is made in combination of the above operation means.

In this case, specifically, the key switch 21 may be provided as operation request manipulation means for making an operation request to the power generation unit 11A and the electric motor 13 when the key switch 21 is switched to ON, and a dedicated push bottom may be provided as operation request stop means for stopping the operation request to the power generation unit 11A and the electric motor 13. In this case, when the key switch is switched to OFF, the operation request only to the electric motor 13 can be stopped.

In relation to the above, the key switch 21 is operated also when the electric motor 13 is intended to be merely stopped. Therefore, strictly, it may be said that the key switch 21 is operation means that is operated "in at least installation or removal". However, on this point, the key switch 21 that is the second operation means corresponds to operation means that is operated in installation and removal and is included in the present invention for the following reasons. It is concluded that the key switch 21 is appropriate in terms of safety and employment of reasonable structure. Next, there is no necessity for the operation means to be the key switch 21. Then, there is a likely alternative in which each power generation unit 11 that is generating power is installed or removed in remote charging.

The various means functionally realized by each ECU 30 on the vehicle side and each ECU 113 on the power generation unit side in the above-described embodiments may be realized by another control unit, a dedicated electronic circuit or a combination thereof.

DESCRIPTION OF REFERENCE NUMERALS 1 electrically driven vehicle
11 power generation unit
111 engine
112 generator
113 ECU on power generation unit side
114 operation switch
115 contact
12 battery
13 electric motor
21 key switch
22 generation stop switch
23 induction switch
30 ECU on vehicle side
41 hold device
50 vehicle opening portion

The invention claimed is:
1. An electrically driven vehicle equipped with a battery usable for running, comprising:
   a power generation unit of engine driven type that includes a generator charging the battery and an engine driving the generator, at least the engine out of the generator and the engine being installed in and removed from the electrically driven vehicle;
   a source for running supplied with power from the battery;
   a hold unit that holds the power generation unit in a state in the power generation unit is installed in the electrically driven vehicle;
   a stop unit that brings the power generation unit in a stopped state when the hold unit stops holding the power generation unit in the state in which the power generation unit is installed in the electrically driven vehicle;
   an electromagnetic function generation unit that is mounted on the vehicle and generates an electromagnetic function in a case where no operation request to the source for running is made; and
   a unit that is installed in the power generation unit and is removable from the vehicle along with the power generation unit, the unit bringing the power generation unit into a stopped state when receiving the electromagnetic function by the electromagnetic function generation unit.

2. The electrically driven vehicle according to claim 1, further comprising:
a lock mechanism that locks the hold unit in a case where an operation request to the source for running is made and stops locking the hold unit in a case where no operation request to the source for running is made.

3. The electrically driven vehicle according to claim 1, further comprising a drive unit that drives the hold unit to hold the power generation unit in the state in which the power generation unit is installed in the electrically driven vehicle in a case where an operation request to the source for running and stops holding the power generation unit in the state in which the power generation unit is installed in the electrically driven vehicle in a case where no operation request to the source for running is made.

4. The electrically drive vehicle according to claim 1, wherein the hold unit includes a lever or cover that blocks the power generation unit from passing through an opening of the electrically driven vehicle through which the power generation unit passes when the power generation unit is removed from the electrically driven vehicle, and thus holds the power generation unit to be installed in the electrically driven vehicle.

5. The electrically driven vehicle according to claim 1, wherein the hold unit includes a bolt that fixes the power generation unit to the electrically driven vehicle, and thus holds the power generation unit to be installed in the electrically driven vehicle.

* * * * *